No. 776,351. PATENTED NOV. 29, 1904.
T. J. ROBERTSON & L. HANEKE.
NUT LOCK.
APPLICATION FILED JULY 23, 1904.
NO MODEL.

WITNESSES:
L. E. Snow.
J. J. Schnarrenberger.

INVENTORS
Thos. J. Robertson
Louis Haneke
BY
J. H. Snow.
ATTORNEY

No. 776,351. Patented November 29, 1904.

UNITED STATES PATENT OFFICE.

THOMAS J. ROBERTSON, OF OAKHILL, AND LOUIS HANEKE, OF EUREKA SPRINGS, ARKANSAS.

NUT-LOCK.

SPECIFICATION forming part of Letters Patent No. 776,351, dated November 29, 1904.

Application filed July 23, 1904. Serial No. 217,823. (No model.)

*To all whom it may concern:*

Be it known that we, THOMAS J. ROBERTSON, a resident of Oakhill, and LOUIS HANEKE, a resident of Eureka Springs, in the county of Carroll and State of Arkansas, citizens of the United States, have invented a new and useful Improvement in Nut-Locks, of which the following is a specification.

Our invention relates to improvements in nut-locks, the object being to provide a device of this description which will be simple, neat, and durable, yet strong and efficient in operation, as well as one which can be easily applied and as easily removed when desirable, nor can it be accidentally released.

To these ends our invention consists in certain novel features of construction and combinations of parts, such as will be more fully described hereinafter and particularly set forth in the claims.

Figure 1:
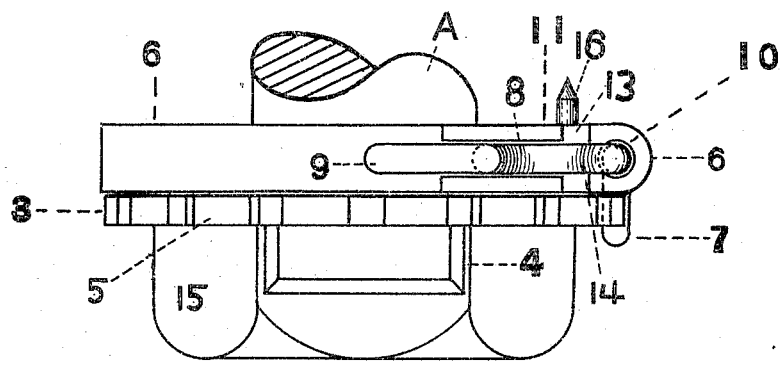
Figure 2:
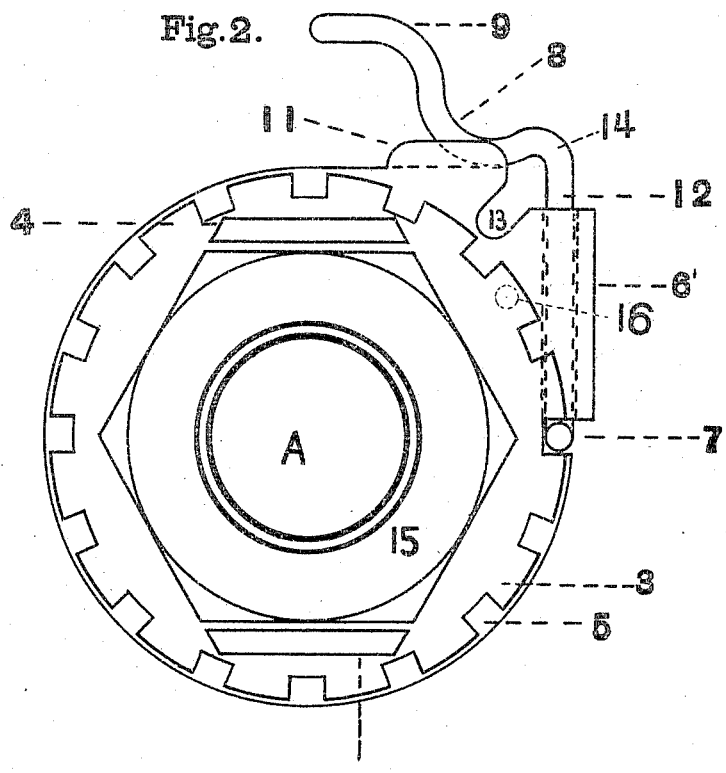

In the accompanying drawings, Figure 1 is a view in side elevation of our improvement, and Fig. 2 is a top plan view thereof.

In the drawings, A indicates the bolt of any suitable or usual construction, upon the threaded end of which bolt is located the nut-lock. The bolt is passed through the rail or other members to be held together and receives upon its threaded end a disk 6, preferably annular, the disk resting snugly against one of the members to be secured (not shown) and provided with a laterally-extending stud 16, adapted to take into the material of the member against which it abuts. Instead of this stud I may make an aperture passing through the disk, the aperture adapted to receive a nail or screw which will perform the same function. The disk is further provided with a sleeve 6', arranged tangentially of the disk and projecting outward from the periphery thereof, the sleeve having an aperture 10 extending therethrough for the reception of an angular pin 12, the pin provided with an upturned end 7, lying at an angle to that portion of the pin within the sleeve 6', while the opposite end of the pin which projects from the outer end of the sleeve is bent inwardly toward the disk, in the arc of a circle preferably, as at 8, to which bent portion the handle 9 is connected. The disk is provided with a pair of ears 11 11, spaced apart from each other, and the bent portion 8 of the pin or key is received between the ears when the nut is locked, the pin being resilient, so as to ride over one of the ears and then snap down between them.

The sleeve and lugs or ears are separated by an indentation 13, adapted to receive the elbow 14, formed in the pin between the portion 12 in the sleeve and the bent portion 8, when the pin is turned.

Seated upon the disk is a member 3, having a toothed periphery 5, the member preferably annular in conformation, and this member is provided with a pair of shoulders 4 4, adapted to embrace opposite sides of the nut 15 to prevent its rotation independently of the member.

Having thus described the various parts and mechanism of our invention, we will set forth its manner of use, which is as follows: The bolt A is first placed in position. The disk 6 is then placed upon the projecting end of the bolt. The nut 15 is now placed on the washer 3, between the shoulders 4 4 thereof, and is screwed tightly on the bolt and against the disk 6. When the nut has been turned as far as possible, the end 7 of the pin which has been turned outward from the disk is now turned upward by means of the handle 9 so that the end 7 will be received between two of the teeth on the washer 3, and when the end 7 is in such position the bent portion 8 will have ridden over one of the lugs or keepers 11 11, the edges of which are slightly rounded to facilitate such movement, and will have snapped down into the seat between the keepers, thereby retaining the end of the pin in engagement with the teeth, and thus locking the nut against rotation until the pin releases the toothed washer. The disk is prevented from rotating on the bolt by means of the stud 16.

It is evident that many changes might be made in the form and arrangement of the parts described without departing from the spirit and scope of our invention, and hence we do not wish to limit ourselves to the exact construction herein disclosed; but, Having fully described our invention, what we claim as new, and desire to secure by Letters Patent, is—

1. A nut-lock comprising a bolt, a non-rotatable disk, a washer having a toothed periphery superimposed upon the disk, separated shoulders projecting above the outer face of the washer, the shoulders having parallel flat faces to receive a tool, a nut received between the shoulders, a locking-pin journaled in the disk and adapted to engage the toothed periphery of the washer, and means carried by the disk and engaged by the pin for releasably retaining the pin in locked position.

2. A nut-lock comprising a bolt, a non-rotatable disk received thereon, a nut and washer receivable on the bolt, means for securing the nut and washer against independent rotation, a releasable resilient pin journaled in the disk and adapted to engage the periphery of the washer to lock the same against rotation and stationary means behind which the resilient pin is received for retaining the latter in locked position.

3. A nut-lock comprising a bolt, a non-rotatable disk received thereon, a nut and washer, means for securing the nut and washer together against independent rotation, a sleeve carried by the disk and arranged tangentially thereof, a locking-pin rotatably received in the sleeve, one end of the pin extending angularly with relation to the body portion of the pin and adapted to engage and lock the washer, the opposite end of the pin having a bent portion formed therein and spaced ears on the disk between which the bent portion is received.

4. A nut-lock comprising a bolt, a non-rotatable disk received thereon, a washer and a nut, means for removably securing the washer and nut together against independent rotation, a rotatable locking-pin carried by the disk, the pin adapted to engage the washer to prevent its rotation and means for releasably retaining the pin in locked position.

5. A nut-lock comprising a bolt, a non-rotatable disk received thereon, a washer and a nut, means for removably securing the washer and nut together against independent rotation, a resilient locking-pin rotatably supported on the disk, a seat in which a portion of the pin is received to retain the pin in locked position, the pin adapted to engage the washer when in locked position to prevent the rotation of the washer.

6. A nut-lock comprising a bolt, a non-rotatable disk received thereon, a washer and a nut, means for removably securing the washer and nut together against independent rotation, a resilient locking-pin, a sleeve carried by the disk in which the pin is rotatably supported, the locking end of the pin extending at an angle to the sleeve to engage the washer, an elbow located at the opposite end of the pin beyond the sleeve, a bent portion formed in the body portion of the pin, the pin terminating in a handle and means for retaining the pin in locked position.

7. The combination with a bolt, a non-rotatable disk received thereon, a washer and a nut, and means for removably securing the washer and nut together against independent rotation, of a locking member journaled on the disk, one end of the locking member adapted to engage the washer to prevent its rotation, a sleeve in which the locking member is journaled, a seat spaced apart from the sleeve, the seat adapted to receive a portion of the pin to retain it in locked position and an elbow formed on the pin and receivable in the space between the seat and sleeve when the pin is turned.

8. The combination in a nut-lock, with a bolt, a washer and a nut rotatable with the washer, of a non-rotatable disk receivable on the bolt, an inherently-resilient locking member journaled on the disk and adapted to engage the washer, a bent portion formed in the locking member, a pair of spaced ears carried by the disk, the bent portion adapted to ride over one of the ears and snap into the seat between them.

In testimony whereof we have signed this specification in the presence of the subscribing witnesses.

THOMAS J. ROBERTSON.
LOUIS HANEKE.

Witnesses as to signature of Thomas J. Robertson:
P. G. MYERS,
S. J. RICE.

Witnesses as to signature of Louis Haneke:
WILL BETTEN,
WM. JENKINS.